US011002639B2

(12) United States Patent
Arakawa (10) Patent No.: US 11,002,639 B2
(45) Date of Patent: May 11, 2021

(54) TIRE DISTORTION DETECTION METHOD

(71) Applicant: TOYO TIRE CORPORATION, Itami (JP)

(72) Inventor: Koji Arakawa, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 0 days.

(21) Appl. No.: 16/390,236

(22) Filed: Apr. 22, 2019

(65) Prior Publication Data

US 2019/0339166 A1    Nov. 7, 2019

(30) Foreign Application Priority Data

May 7, 2018  (JP) .............................. JP2018-089101

(51) Int. Cl.

| G01M 17/02 | (2006.01) |
|---|---|
| G01N 23/083 | (2018.01) |
| G01N 23/04 | (2018.01) |
| G06T 7/55 | (2017.01) |
| G01N 23/18 | (2018.01) |

(52) U.S. Cl.
CPC ........ *G01M 17/028* (2013.01); *G01M 17/022* (2013.01); *G01N 23/04* (2013.01); *G01N 23/083* (2013.01); *G01N 23/185* (2013.01); *G06T 7/55* (2017.01); *G01N 2223/627* (2013.01)

(58) Field of Classification Search
CPC ............. G01M 17/028; G01M 17/022; G01M 17/021; G01N 23/04; G01N 23/083; G01N 23/185; G01N 2223/627; G01N 2223/419; G01N 23/046; G06T 7/55; G06T 2207/10012; G06T 7/001; G01B 11/16

USPC .......................................................... 378/61
See application file for complete search history.

(56) References Cited

U.S. PATENT DOCUMENTS

| 3,511,293 A | 5/1970 | Matthews |
|---|---|---|
| 5,962,778 A | 10/1999 | Billieres |
| 2003/0095050 A1 | 5/2003 | Mancosu et al. |
| 2005/0081613 A1 | 4/2005 | Hattori |
| 2017/0087939 A1 | 3/2017 | Lacko et al. |

(Continued)

FOREIGN PATENT DOCUMENTS

| CN | 1358146 A | 7/2002 |
|---|---|---|
| DE | 197 48 544 C1 | 7/1999 |
| DE | 69 827 708 T2 | 12/2005 |

(Continued)

OTHER PUBLICATIONS

Office Action dated May 6, 2020, issued in counterpart DE Application No. 102019110469.6, with English Translation. (9 pages).

(Continued)

*Primary Examiner* — Courtney D Thomas
(74) *Attorney, Agent, or Firm* — Westerman, Hattori, Daniels & Adrian, LLP (57) ABSTRACT

A tire distortion detection method includes a first step of forming a portion to be detected on a surface of an inner liner, a second step of detecting the portion to be detected in any two states from a formation of a product tire from a tire component including the inner liner to a change for a load condition on the product tire, and a third step of comparing positions of the portions to be detected in the two states obtained in the second step.

20 Claims, 5 Drawing Sheets

(56) References Cited

U.S. PATENT DOCUMENTS

2018/0172557 A1* 6/2018 Ghidotti Piovan .......................... G01N 21/8851
2019/0339166 A1 11/2019 Arakawa

FOREIGN PATENT DOCUMENTS

| | | |
|---|---|---|
| DE | 10 2014 209 423 A1 | 11/2015 |
| DE | 10 2017 209 677 A1 | 12/2018 |
| DE | 102017209677 A1 * 12/2018 | ............... B60C 9/28 |
| EP | 1 239 261 B1 | 6/2008 |
| JP | 6-218844 A | 8/1994 |
| JP | 7-32829 A | 2/1995 |
| JP | 2006-292450 A | 10/2006 |
| JP | 2006-308316 A | 11/2006 |
| JP | 2009-250963 A | 10/2009 |
| JP | 2013-64709 A | 4/2013 |

OTHER PUBLICATIONS

Non-Final Office Action dated Sep. 3, 2020, issued in counterpart U.S. Appl. No. 16/390,507 (11 pages).
Office Action dated Aug. 19, 2020, issued in counterpart DE Application No. 102019110468.8, with English translation (9 pages).
Office Action dated Oct. 20, 2020, issued in counterpart CN Application No. 201910328617.9, with English translation (13 pages).
Office Action dated Dec. 21, 2020, issued in counterpart CN Application No. 201910329209.5, with English translation (12 pages).
Final Office Action dated Mar. 5, 2021, issued in U.S. Appl. No. 16/390,507 (18 pages).

\* cited by examiner

TIRE DISTORTION DETECTION METHOD

CROSS-REFERENCE TO RELATED APPLICATIONS

This application claims priority of Japanese Patent Application No.: 2018-089101 filed on May 7, 2018, the content of which is incorporated herein by reference.

BACKGROUND OF THE INVENTION

Technical Field

The present invention relates to a tire distortion detection method.

Related Art

Conventionally, a method of irradiating a tire with an X-ray and observing the inside of the tire has been known (for example, see JP 2006-308316 A).

However, in the conventional method, it is not taken into consideration what distortion occurs on an inner surface of the tire.

SUMMARY

It is an object of the present invention to provide a tire distortion detection method that makes it possible to detect, by a simple method, distortion on an inner surface of a tire which has conventionally been difficult to detect.

As means for achieving the above object, according to the present invention, there is provided a tire distortion detection method including a first step of forming a portion to be detected on a surface of an inner liner, a second step of detecting the portion to be detected in any two states form a formation of a product tire from a tire component including the inner liner to a change of a load condition on the product tire, and a third step of comparing positions of the portions to be detected in the two states obtained in the second step.

According to the above, by comparing positions of the portions to be detected in various states of a tire, a state of generation of distortion on an inner surface of the inner liner can be grasped.

In the second step, a portion to be detected is preferably detected in a no-load state of the product tire and a load state in which the product tire is deformed.

In the second step, the load state preferably includes rolling, driving, turning, or braking of a tire.

Detection of the portion to be detected is preferably performed by imaging means.

Detection of the portion to be detected may be performed by an optical displacement meter.

The portion to be detected is a metal mark, and detection of the portion to be detected may be performed by an X-ray CT device.

In this case, the portion to be detected is preferably formed in a plurality of dotted, linear, or random patterns juxtaposed at predetermined intervals.

According to the present invention, it is possible to detect, by a simple method, distortion on an inner surface of a tire which has conventionally been difficult to detect.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Hereinafter, embodiments according to the present invention will be described with reference to the accompanying drawings. It should be noted that description below is merely exemplary in nature and is not intended to limit the invention, its application, or its use. Further, the drawings are schematic, and ratios of dimensions and the like are different from actual ones.

Figure 1:
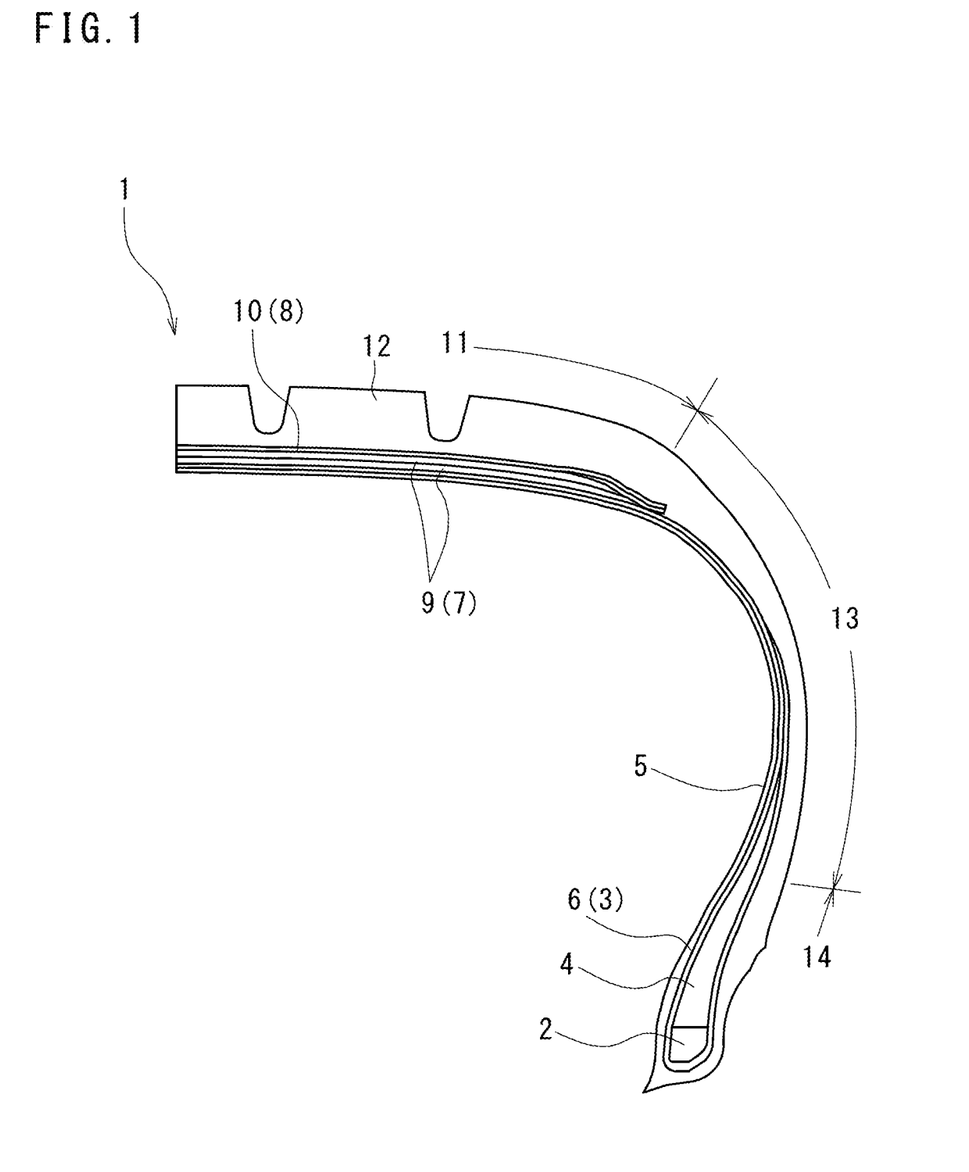
FIG. 1 is a meridian half cross-sectional view of a pneumatic tire according to the present embodiment.

FIG. 1 is a meridian half cross-sectional view of a pneumatic tire according to the present embodiment (hereinafter simply referred to as a tire 1). In the tire 1, a carcass 3 is stretched between a pair of bead cores 2 (one of them is not shown).

A bead filler 4 is connected to the bead core 2, and both end sides of a carcass ply 6 are rolled up there. An inner liner 5 is provided on the inner side in a tire radial direction of the carcass ply 6.

The carcass 3 includes at least one carcass ply 6 (here, one carcass ply). The carcass ply 6 is configured with a plurality of carcass cords arranged at predetermined intervals and coating rubber covering these carcass cords. For the carcass cord, for example, organic fiber cords of rayon, aramid, polyester and the like are used. The carcass cord extends in a direction substantially orthogonal to a tire circumferential direction of a green tire.

On an outer side in the tire radial direction of the carcass ply 6, a belt layer 7 and a belt reinforcing layer 8 are arranged in this order.

The belt layer 7 includes a plurality of (in this case, two) belts 9. Each of the belts 9 is configured with a plurality of belt cords arranged at predetermined intervals and coating rubber covering the belt cords. For the belt cord, a steel cord is used. The belt cord extends obliquely with respect to the tire circumferential direction. Between the belts 9, inclination directions of the belt cords are different.

The belt reinforcing layer 8 includes at least one (here, one) cap ply 10. The cap ply 10 is configured with a plurality of cap ply cords arranged at predetermined intervals and coating rubber covering these cap ply cords. For the cap ply cord, an organic fiber cord of polyester or the like is used. The cap ply cord extends in the tire circumferential direction.

On an outer side in the tire radial direction of the belt reinforcing layer 8, tread rubber 12 that becomes a tread portion 11 after vulcanization and molding is provided.

A rubber layer is provided from the tread rubber 12 toward the bead core 2, so that a side wall portion 13 and then a bead portion 14 are formed.

Figure 2:
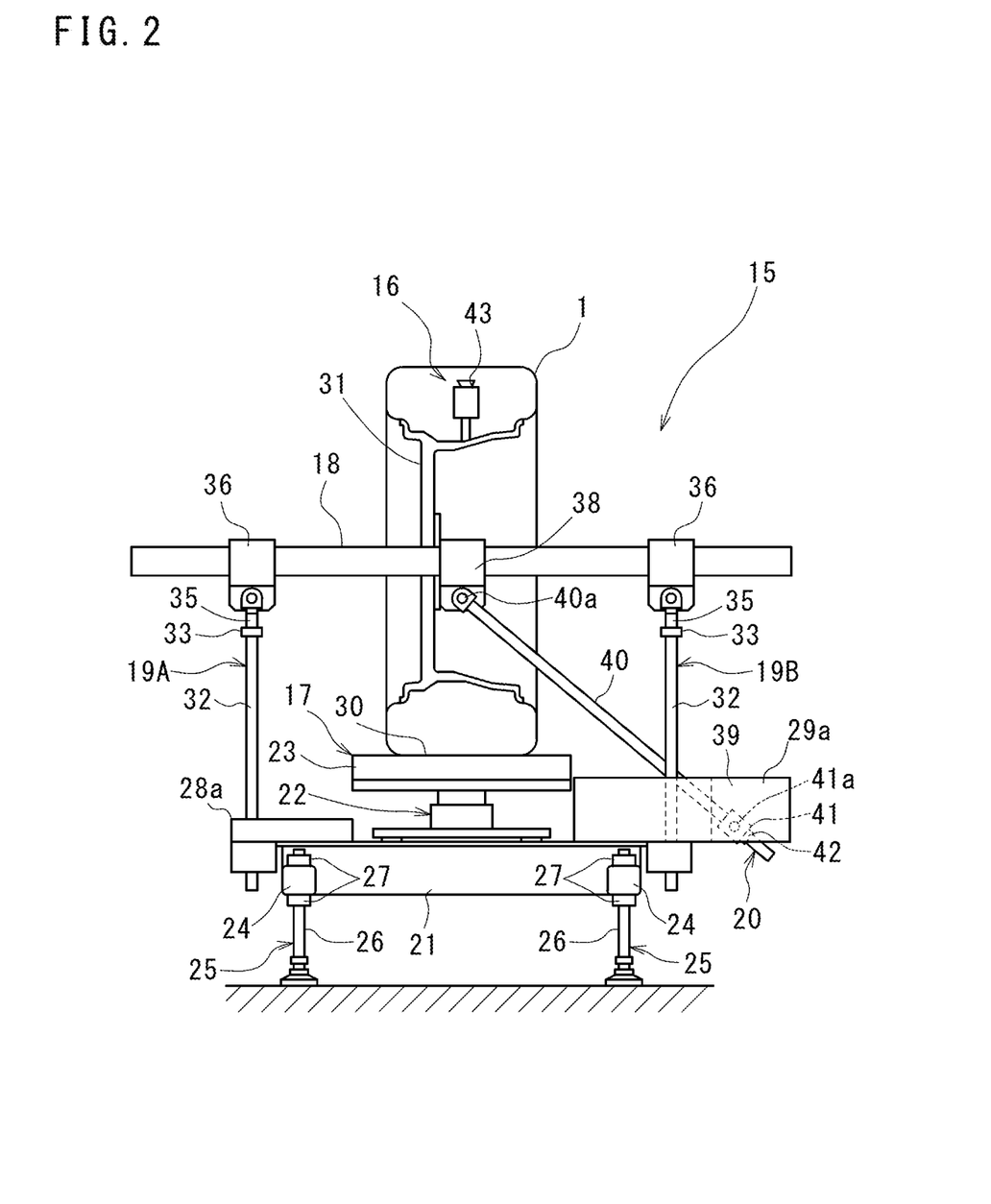
FIG. 2 is a schematic diagram showing a tire distortion detection device according to the present embodiment.

FIG. 2 shows a tire distortion detection device according to the present embodiment. This tire distortion detection device includes a tire support device 15 and a tire detection device 16.

The tire support device 15 includes a support base 17 on which part of an outer peripheral surface of the tire 1 abuts, a support member 18 for supporting the tire 1, a longitudinal load application mechanism including longitudinal load application members 19A and 19B for holding the tire 1 between itself and the support base 17 with the support member 18 interposed between them, and a lateral load application member 20 for pulling the tire 1 in a horizontal direction via the support member 18.

The support base 17 includes a base 21, a load cell 22, and a support plate 23.

Figure 3:
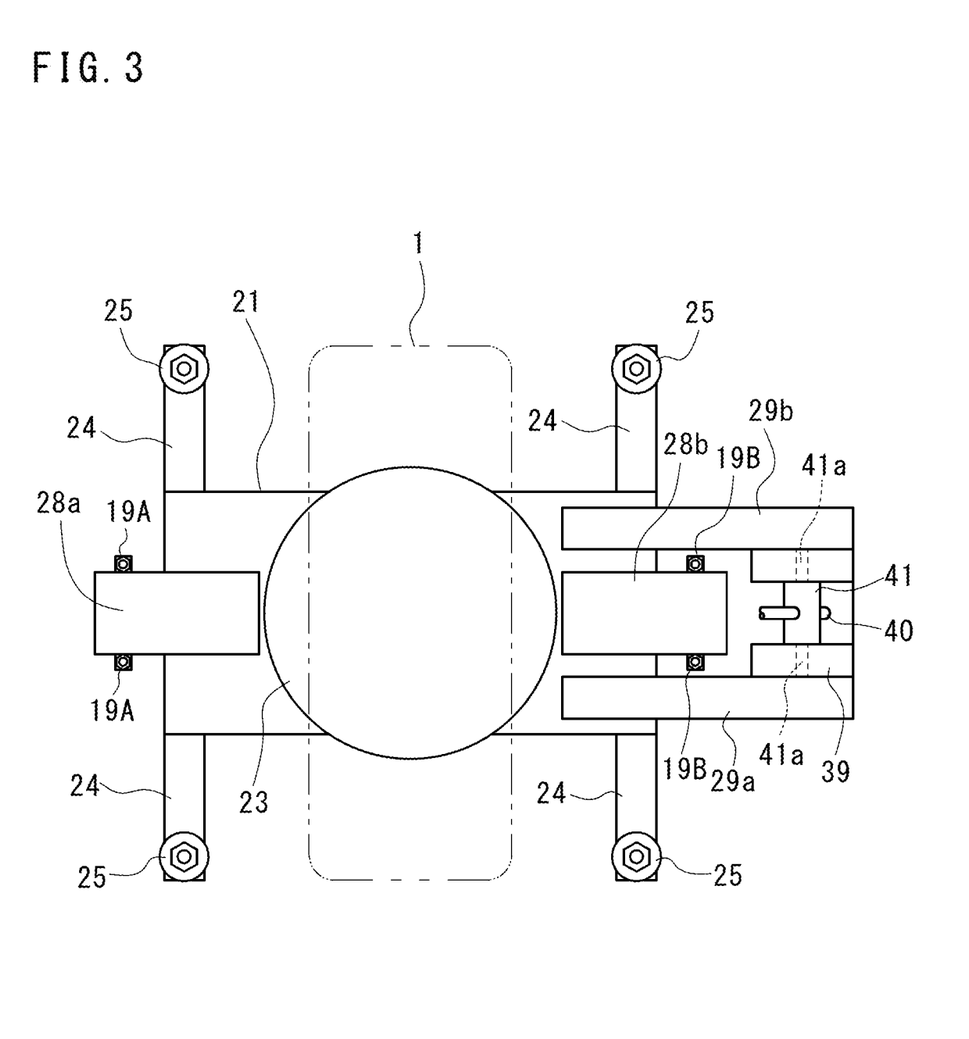
FIG. 3 is a plan view of a support base shown in FIG. 2.

As shown in FIG. 3, the base 21 is formed of a plate-like body having a rectangular shape in plan view. Extending portions 24 extend from four corners of the base 21 in the horizontal direction (vertical direction in FIG. 3) on both sides. A height adjusting member 25 is attached to a tip portion of each of the extending portions 24. In the present embodiment, the height adjusting member 25 is configured with a rod 26 vertically penetrating the tip portion of each of the extending portions 24, and a pair of upper and lower nuts 27 threadedly engaged with a male screw formed on an outer peripheral surface of the rod 26. By changing a screwing position of the nuts 27 sandwiching the extending portion 24, a projecting dimension of the rod 26 toward a lower side from the extending portion 24 can be adjusted. Here, the height adjusting member 25 is used for adjusting an inclination angle of the support plate 23. That is, by changing positions of the nuts 27 on the rods 26 in two locations positioned in one or both sides in a tire width direction, an inclination angle of the support plate 23 can be adjusted. A lower end portion of the rod 26 is expanded in a circular shape so that a state of placement on the ground is stabilized.

Fixed blocks 28a and 28b are fixed to both end sides on an upper surface of the base 21. A lower end portion of the longitudinal load application member 19A described later is fixed to the fixed block 28a on one side and a lower end portion of the longitudinal load application member 19B is fixed to the fixed block 28b on the other side. Further, on one end side on an upper surface of the base 21, auxiliary blocks 29a and 29b are fixed to both sides of the fixed block 28b. Lower end portions of connecting rods 32 of the lateral load application member 20 are connected to the auxiliary blocks 29a and 29b.

The load cell 22 is fixed between the base 21 and the support plate 23. The load cell 22 expands a deformation amount caused by a load acting on the support plate 23, converts it into an electric signal by a strain gauge (not shown), and outputs it to a control device (not shown). The control device calculates the load acting on the support plate 23 based on the input electric signal from the strain gauge.

The support plate 23 is made from a material excellent in permeability, such as wood, acrylic, or the like, that is, a material in which a transmitted X-ray is hardly attenuated. The upper surface of the support plate 23 serves as the support surface 30 against which a portion of a tread portion 11 of the tire 1 abuts. An inclination angle of the support plate 23 with respect to a horizontal plane can be adjusted by the height adjusting member 25 provided on the base 21. Here, a tread surface of the tire 1 to be placed is inclined with respect to the horizontal plane in the tire width direction.

The support member 18 is a cylindrical body made from a metal material, such as stainless steel. Both end portions of the support member 18 are connected to and supported by the fixed blocks 28a and 28b of the support base 17 by the longitudinal load application members 19A and 19B which will be described later. The tire 1 is attached to the support member 18. The tire 1 is fixed to a wheel 31 with a first attachment portion 38 described later interposed between them in a state in which the support member 18 is inserted through a center hole of the attached wheel 31. As a result, a load can be applied to the tire 1 toward the support surface 30 of the support plate 23 via the support member 18 by the longitudinal load application members 19A and 19B.

Figure 4:
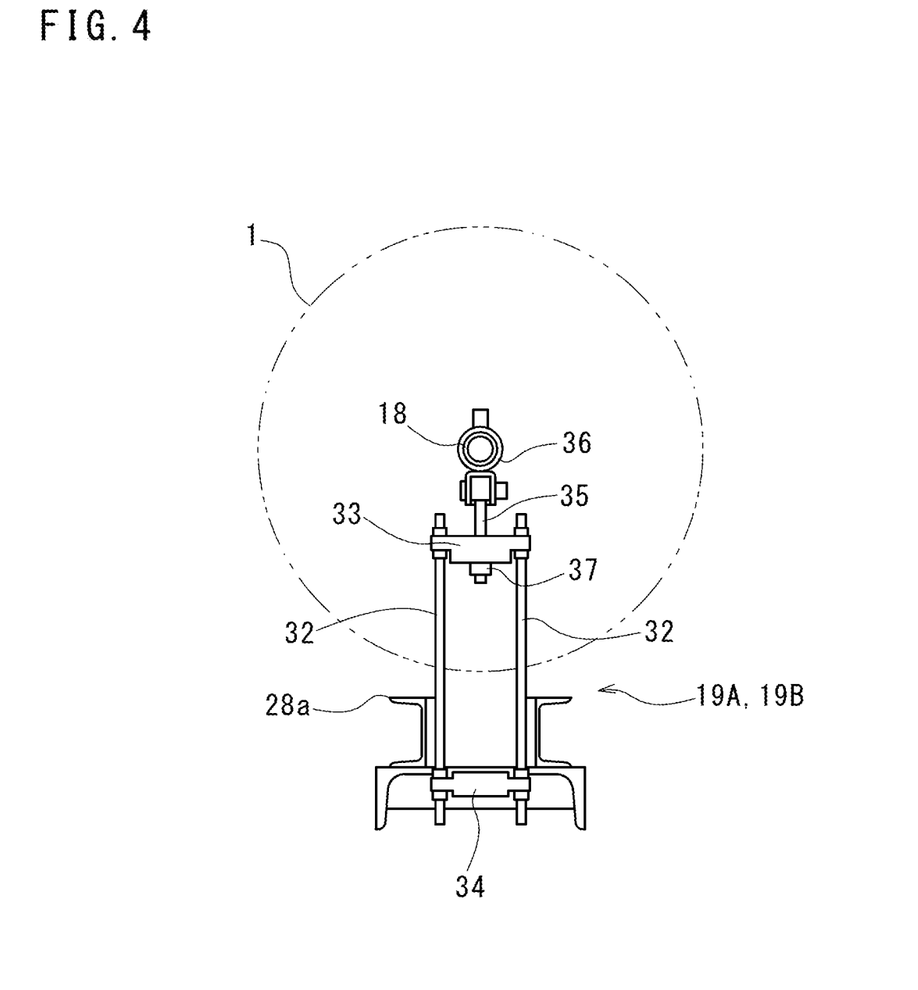
FIG. 4 is a side view of a load application member shown in FIG. 2.

The longitudinal load application members 19A and 19B constituting the longitudinal load application mechanism connect both end sides of the support member 18 and the support base 17 in such a manner that a length between them is adjustable. The longitudinal load application members 19A and 19B are disposed in both end portions in a longitudinal direction of the support base 17. With reference also to FIG. 4, each of the longitudinal load application members 19A and 19B includes a pair of the connecting rods 32 arranged at predetermined intervals, a first connecting portion 33 connecting the connecting rods 32 in an upper end portion, and a second connecting portion 34 connecting them in a lower end portion. The first connecting portion 33 is connected to a support ring 36 attached to the support member 18 with a longitudinal shaft portion 35 which is a shaft member of the present invention interposed between them. A male screw is formed on an outer peripheral surface of the longitudinal shaft portion 35 and is threadedly engaged with a nut 37 in a lower side after passing through the first connecting portion 33. By changing the screwing position of the nut 37 at the longitudinal shaft portion 35, a tensile force acting on the support member 18 can be adjusted.

The lateral load application member 20 includes an inclined shaft portion 40 connected between a first attachment portion 38 fixed to the outer periphery of the support member 18 and a second attachment portion 39 fixed to the auxiliary blocks 29a and 29b. As shown in FIG. 1, one end portion of the inclined shaft portion 40 is connected to the first attachment portion 38 so as to be rotatable around a support shaft 40a. The second attachment portion 39 is provided with a bearing portion 41 which is rotatable around a support shaft 41a. A male screw is formed on an outer peripheral surface of the other end portion of the inclined shaft portion 40. The inclined shaft portion 40 is caused to pass through the bearing portion 41 in a state where the other end portion is slidable in an axial center direction. A nut 42 is threadedly engaged with the inclined shaft portion 40 in a projecting portion from the bearing portion 41. By changing the screwing position of the nut 42 in the inclined shaft portion 40, a tensile force acting on the support member 18 can be adjusted. That is, it is possible to set a load in a lateral (horizontal) direction acting on the tire 1 via the support member 18.

The tire detection device 16 is provided with a stereo camera 43 which is an example of imaging means for imaging an inner surface of the tire 1. The stereo cameras 43 (two cameras in this case) are attached to the wheel 31 mounted on the tire 1 and arranged in internal space defined by the tire 1 and the wheel 31. Each camera captures an image of the same area on an inner surface of an inner liner 5. Then, it is possible to three-dimensionally capture an inner surface shape of the inner liner 5 based on the captured image. In this case, distortion of the belt 9 is observed by capturing an image of an inner surface of a region where the belt layer 7 is formed.

In a case of using the stereo camera 43, a portion 44 to be detected that is detectable by a camera is formed by painting or the like on an inner surface of the inner liner 5. A mode of the portion 44 to be detected may be linear, dotted, lattice-like, random pattern, or the like.

Note that the tire support device is not limited to the above-described one, and various conventionally known configurations can be employed (for example, see Japanese Patent Application Laid-Open Nos. 2006-308316, 2013-

64709, 7-32829, 6-218844, and the like). For example, when the tire support structure described in JP 2006-308316 A is employed, it is possible to detect distortion on an inner surface of a tire while the tire 1 is rotated on a belt. Further, the tire support device can be realized by a vehicle.

Next, a method of detecting distortion of the tire 1 by the tire distortion detection device will be described.

Figure 5:
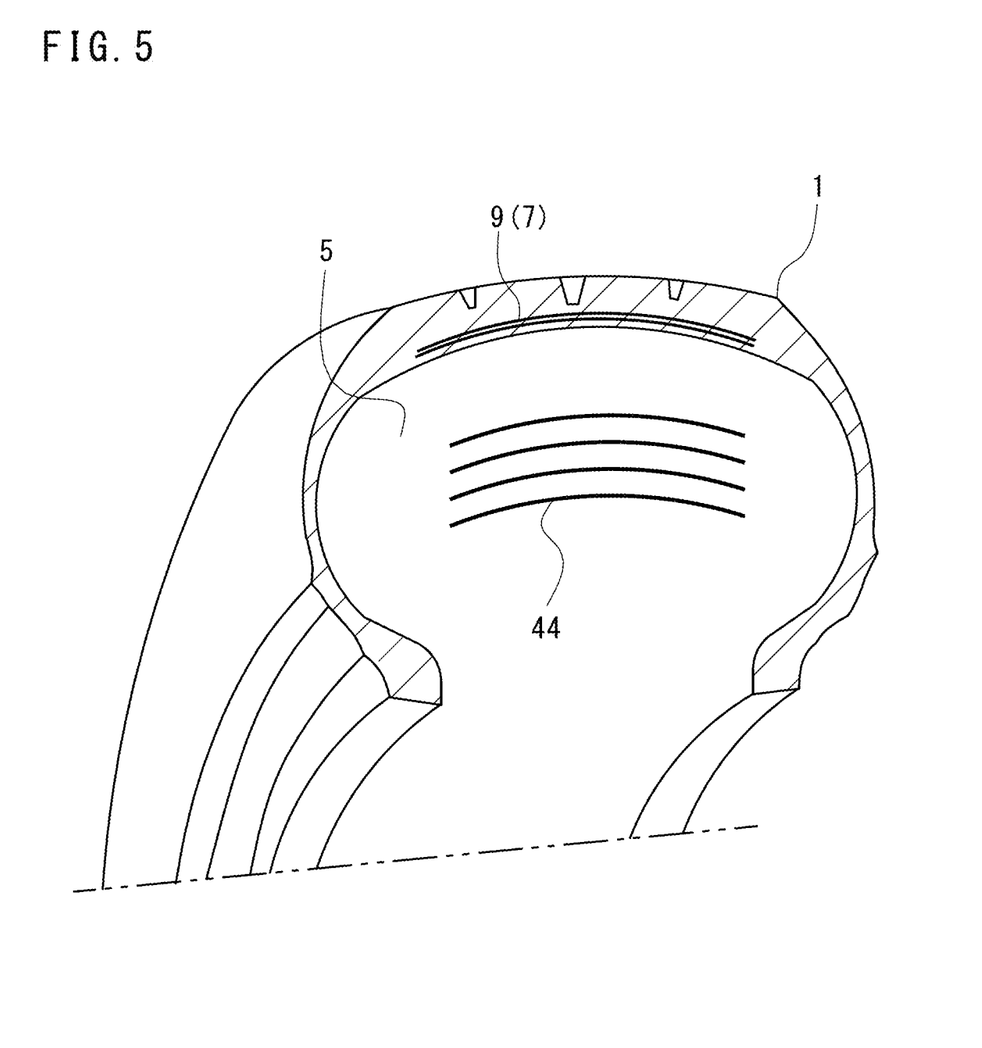
FIG. 5 is a perspective view showing part of the pneumatic tire of FIG. 1.

In the present embodiment, the portion 44 to be detected is formed on an inner surface of the inner liner 5 (first step). In a case where the portion 44 to be detected is formed in a linear shape, as shown in FIG. 5, the portions 44 to be detected are preferably arranged at predetermined intervals in a tire radial direction. Further, in a case where the portion 44 to be detected is formed in a dotted shape, it is preferable that a plurality of dots or line segments be formed at regular intervals in the tire circumferential direction and the obtained dot or line segment rows be arranged at predetermined intervals in the tire radial direction. Further, in a case where the portion 44 to be detected is formed in a lattice shape, a plurality of straight lines are preferably arranged at predetermined intervals in the tire circumferential direction and the tire radial direction, so that the straight lines are made orthogonal to each other. However, these are not necessarily equally arranged, and they may be arranged randomly. In a case where the portions 44 to be detected are formed in a random pattern, a free pattern is preferably formed by spraying them on an inner surface of a tire or the like.

Note that the portion 44 to be detected may be formed on an inner surface of the inner liner 5 either after the product tire 1 is formed or in a stage of being a tire component. In a case where the portion 44 to be detected is formed on an inner surface of the inner liner 5 in a stage of being a tire component, it is preferably assembled together with other tire components to form the green tire 1, so that the green tire 1 is vulcanized and molded to form the product tire 1. Then, in the obtained product tire 1, as will be described later, a strain state is preferably detected by changing a load condition (second step).

In the tire 1 in which the portion 44 to be detected is formed on an inner surface, distortion is detected as described below.

The tire 1 is mounted on the tire support device 15. At this time, the stereo camera 43 is attached to the wheel 31 so as to be located in internal space of the tire 1. Further, a load detected by the load cell 22 is set to a value not exceeding a value of a self-weight of the tire 1 or the wheel 31 (no load is applied to the tire 1 by the longitudinal load application members 19A and 19B or the lateral load application member 20).

Imaging with the stereo camera 43 is executed in a non-pressure state in which the wheel 31 is merely attached to the tire 1 and a pressurized (inflated) state in which the internal space of the tire 1 is filled with air until a desired internal pressure is reached. From each obtained image, each of the portions 44 to be detected can be three-dimensionally captured. Therefore, a change in position of each of the portions 44 to be detected is calculated, and distortion on the inner surface of the inner liner 5 is detected. Further, distortion on the inner surface of the inner liner 5 may be detected by capturing a change in position of each of the portions 44 to be detected by digital image correlation method (DIC) or sampling moire method.

In a case where a longitudinal load is applied to the tire 1, the screwing positions of the nuts 37 of the longitudinal load application members 19A and 19B are changed, and a tensile force is applied to the tire 1 via the support member 18 to press the tire 1 against the support surface 30 of the support plate 23. The pressing force is measured by a detection signal from the load cell 22. When a measured value reaches a desired value, tightening of the nut 37 is stopped. Here, the desired value is a value when the pressing is performed until the measured value reaches a normal load. Here, the normal load means a load defined by standards on which the tire 1 relies on, that is, "maximum loading capability" in the JATMA standard, a "maximum value" stated in "TIRE LOAD LIMITS AT VARIOUS COLD INFLATION PRESSURES" in the TRA standard, and "LOAD CAPACITY" in the ETRTO standard.

In a state where a longitudinal load is applied to the tire 1, imaging is executed by the stereo camera 43 in a manner similar to the above. Then, based on an imaging result in the inflated state described above and a current imaging result, a change in position of each of the portions 44 to be detected is calculated, and distortion on the inner surface of the inner liner 5 is detected. In this case as well, as described above, when a distance between the portions 44 to be detected is small, it can be determined that compressive strain has occurred in this location, and when a distance between the portions 44 to be detected is large, it can be determined that tensile strain has occurred in this location.

When a lateral load is applied to the tire 1, a tensile force is applied by operating the lateral load application member 20. In this case, among tensile forces acting on the tire 1 via the support member 18 by the longitudinal shaft portion 35 and the inclined shaft portion 40, a total value of components in a vertical direction toward the support surface 30 is a load that presses the tire 1 against the support surface 30, and a total value of components in the horizontal direction orthogonal to the support surface 30 is a lateral load acting on the tire 1.

In a state where a lateral load is applied to the tire 1, imaging is executed by the stereo camera 43 in a manner similar to the above. Then, based on an imaging result in the inflated state described above, or an imaging result in a state where a longitudinal load is applied to the tire 1, and a current imaging result, a change in position of each of the portions 44 to be detected is calculated, and distortion on the inner surface of the inner liner 5 is detected. In this case as well, as described above, when a distance between the portions 44 to be detected is small, it can be determined that compressive strain has occurred in this location, and when a distance between the portions 44 to be detected is large, it can be determined that tensile strain has occurred in this location.

As described above, according to the above-described embodiment, the portion 44 to be detected is formed on the inner surface of the tire 1, that is, the inner surface of the inner liner 5, so that the portion 44 to be detected can be formed by a simple method. Further, since the imaging result of the stereo camera 43 is utilized, the inner surface of the inner liner 5 can be caught three-dimensionally and a generation state of distortion can be grasped more accurately.

It should be noted that the present invention is not limited to the configuration described in the above embodiment, and various modifications are possible.

In the above embodiment, the stereo camera 43 is used to detect the inner surface of the tire 1, but other imaging means, such as an X-ray CT device, a laser displacement meter, or the like, may be used.

The X-ray CT device includes an X-ray irradiation section for irradiating the inner surface of the tire 1 with an X-ray, and an X-ray detection section for detecting an X-ray that has passed through the tire 1. The X-ray irradiation section is preferably attached to the wheel 31 and arranged in the internal space defined by the tire 1 and the wheel 31. Further, the X-ray detection section is preferably disposed outside on the opposite side of the X-ray irradiation section with a side wall section 13 interposed between them.

In a case where the X-ray CT device is used, the portion 44 to be detected made from, for example, copper or a metal material having a density close to copper (density of 6 to 10 g/cm$^3$) needs to be formed on the inner surface of the inner liner 5. The portion 44 to be detected is preferably applied to the inner surface of the inner liner 5. Further, a thickness of the portion 44 to be detected to be formed can be 0.1 to 10 mm. However, the thickness of the portion 44 to be detected is preferably 1 mm or smaller so as not to affect deformation of the tire 1. Further, a material and thickness of the metal material used for the portion 44 to be detected are preferably set so that a value obtained by multiplying the density (g/cm$^3$) by the thickness (cm) is within the range of 0.1 to 50, or preferably 0.1 to 10.

In a case where a laser displacement meter is used, an uneven shape can be used on an inner surface (for example, an inner surface of the side portion) of the tire 1 for the portion 44 to be detected. For example, an uneven shape in which grooves and ridges extending in the tire circumferential direction are alternately formed in the tire radial direction may be employed. According to this, from a change in width dimension of the grooves or the ridges before and after the inflation of the tire 1, when a width dimension is narrowed, it can be determined that compressive strain has occurred, and when the width dimension is widened, it can be determined that tensile strain has occurred.

In the above embodiment, distortion of the inner surface of the product tire 1 is detected. However, distortion may be detected in a state of a green tire before vulcanization and molding, or the inner liner 5 in a state of being a tire component before becoming a green tire may be detected. A green tire and the inner liner 5 are preferably configured to be attached to a dedicated fixing jig. In a case of a green tire, a tire stands and the like can also be used.

In the above-described embodiment, distortion between before and after vulcanization and molding or distortion between before and after inflation is detected. Alternatively, distortion may be detected, including the above two cases, between any two of the following states: (1) a state of a tire portion (the inner liner 5); (2) a state of a green tire; (3) a no-load state in which no load is applied to the product tire 1; (4) a state in which the product tire 1 is inflated; (5) a state in which a longitudinal load is applied to the product tire 1; (6) a state in which a lateral load is applied to the product tire 1; (7) a state in which a load is applied to the product tire 1 in a front-rear direction; (8) a state in which the product tire 1 is freely rolled (no rotational torque is acting); (9) a state in which a braking force is applied to the product tire 1 so as to roll the product tire 1; (10) a state in which a driving force is applied to the product tire 1 so as to roll the product tire 1; and (11) a state in which the product tire 1 is turned (a state in which the product tire 1 is rolled at a slip angle).

For example, the product tire 1 may be mounted on a vehicle, and distortion due to other deformations, such as a deformation between before and after grounding, a deformation between before and after the cornering, and the like, may be detected.

In the deformation between before and after grounding, a change in position of the portion 44 to be detected between a case where no load is applied to the product tire 1 by the longitudinal load application members 19A and 19B and a case where the load is applied is preferably detected in a similar manner to that described above.

In the deformation between before and after the cornering, while a load is applied to the product tire 1 by the longitudinal load application members 19A and 19B, a change in position of the portion 44 to be detected between a case where no lateral load is further applied by the lateral load application member 20 and a case where the lateral load is applied is preferably detected.

What is claimed is:

1. A tire distortion detection method, comprising:
a first step of forming a portion to be detected on a surface of an inner liner which is an inner surface of the tire;
a second step of detecting the portion to be detected in any two states from a formation of a product tire from a tire component including the inner liner to a change of a load condition on the product tire;
a third step of obtaining a change in the position of the portion to be detected by comparing positions of the portions to be detected in the two states obtained in the second step; and
a fourth step of detecting a distortion of the inner liner on the basis of the change obtained in the third step.

2. The tire distortion detection method according to claim 1, wherein in the second step, the portion to be detected is detected in both a no-load state of the product tire and a load state in which the product tire is deformed.

3. The tire distortion detection method according to claim 1, wherein in the second step, the load condition includes rolling, driving, turning, or braking of a tire.

4. The tire distortion detection method according to claim 2, wherein in the second step, the load state includes rolling, driving, turning, or braking of a tire.

5. The tire distortion detection method according to claim 1, wherein
the portion to be detected is a metal mark, and
detection of the portion to be detected is performed by an X-ray CT device.

6. The tire distortion detection method according to claim 2, wherein
the portion to be detected is a metal mark, and
detection of the portion to be detected is performed by an X-ray CT device.

7. The tire distortion detection method according to claim 3, wherein
the portion to be detected is a metal mark, and
detection of the portion to be detected is performed by an X-ray CT device.

8. The tire distortion detection method according to claim 4, wherein
the portion to be detected is a metal mark, and
detection of the portion to be detected is performed by an X-ray CT device.

9. The tire distortion detection method according to claim 5, wherein the portion to be detected is formed in a plurality of dotted, linear, or random patterns juxtaposed at predetermined intervals.

10. The tire distortion detection method according to claim 6, wherein the portion to be detected is formed in a plurality of dotted, linear, or random patterns juxtaposed at predetermined intervals.

11. The tire distortion detection method according to claim 7, wherein the portion to be detected is formed in a plurality of dotted, linear, or random patterns juxtaposed at predetermined intervals.

12. The tire distortion detection method according to claim 8, wherein the portion to be detected is formed in a plurality of dotted, linear, or random patterns juxtaposed at predetermined intervals.

13. The tire distortion detection method according to claim 1, wherein detection of the portion to be detected is performed by imaging means.

14. The tire distortion detection method according to claim 2, wherein detection of the portion to be detected is performed by imaging means.

15. The tire distortion detection method according to claim 3, wherein detection of the portion to be detected is performed by imaging means.

16. The tire distortion detection method according to claim 4, wherein detection of the portion to be detected is performed by imaging means.

17. The tire distortion detection method according to claim 1, wherein detection of the portion to be detected is performed by an optical displacement meter.

18. The tire distortion detection method according to claim 2, wherein detection of the portion to be detected is performed by an optical displacement meter.

19. The tire distortion detection method according to claim 3, wherein detection of the portion to be detected is performed by an optical displacement meter.

20. The tire distortion detection method according to claim 4, wherein detection of the portion to be detected is performed by an optical displacement meter.

* * * * *